US012101648B2

(12) United States Patent
Chou et al.

(10) Patent No.: US 12,101,648 B2
(45) Date of Patent: Sep. 24, 2024

(54) WIRELESS COMMUNICATION SYSTEM AND METHOD FOR PERFORMING COMMUNICATION AND COMPUTING

(71) Applicant: FG Innovation Company Limited, Tuen Mun (HK)

(72) Inventors: Chie-Ming Chou, Taipei (TW); Fang-Ming Lu, Taipei (TW); Kuo-Liang Ho, Taipei (TW); Yi-Chuan Huang, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 402 days.

(21) Appl. No.: 17/497,151

(22) Filed: Oct. 8, 2021

(65) Prior Publication Data

US 2022/0116796 A1 Apr. 14, 2022

Related U.S. Application Data

(60) Provisional application No. 63/090,637, filed on Oct. 12, 2020.

(51) Int. Cl.
*H04W 24/02* (2009.01)
*G06N 5/02* (2023.01)
*H04W 72/0453* (2023.01)

(52) U.S. Cl.
CPC .............. *H04W 24/02* (2013.01); *G06N 5/02* (2013.01); *H04W 72/0453* (2013.01)

(58) Field of Classification Search
CPC . H04W 24/02; H04W 72/0453; H04W 36/14; H04W 48/18; H04W 36/0033; H04W 36/30; G06N 5/02; G06N 20/00; H04L 41/5051; H04L 41/16
See application file for complete search history.

(56) References Cited

U.S. PATENT DOCUMENTS

| 10,694,399 | B1 * | 6/2020 | Tran ........................ H01Q 3/01 |
| 2017/0367036 | A1 | 12/2017 | Chen et al. |
| 2018/0270820 | A1 * | 9/2018 | Gupta ................. H04W 28/082 |
| 2019/0138934 | A1 * | 5/2019 | Prakash ................ G06F 9/5072 |
| 2019/0268819 | A1 * | 8/2019 | Kim ....................... H04W 72/04 |
| 2020/0053834 | A1 * | 2/2020 | Dahan ................. H04L 41/0816 |
| 2020/0195495 | A1 | 6/2020 | Parker et al. |

(Continued)

FOREIGN PATENT DOCUMENTS

| CN | 109891832 | 6/2019 |
| TW | 202037208 A | 10/2020 |
| WO | 2019164518 | 8/2019 |

OTHER PUBLICATIONS

Xuemin Shen et al., "AI-Assisted Network-Slicing Based Next-Generation Wireless Networks", Jan. 30, 2020.

(Continued)

*Primary Examiner* — Tejis Daya
(74) *Attorney, Agent, or Firm* — ScienBiziP, P.C.

(57) ABSTRACT

A wireless communication system for performing communication and computing includes a plurality of cells configured to perform the communication between at least one user equipment and at least one network; and an Artificial Intelligence (AI) computing platform comprising a plurality of AI slices to perform the computing, wherein the plurality of cells are located in air, space, sea, or land.

19 Claims, 5 Drawing Sheets

(56) References Cited

U.S. PATENT DOCUMENTS

2022/0377650 A1* 11/2022 Kotaru ............... H04W 24/10
2023/0337065 A1* 10/2023 Xu ..................... H04W 24/02

OTHER PUBLICATIONS

Dario Bega et al., "Network Slicing Meets Artificial Intelligence: An AI-Based Framework for Slice Management", IEEE Communications Magazine, Jun. 2020.

ITU-T SG13, LS/o about consent of Machine Learning related ITU-T Recommendations Y.3173, Y.3174 and agreement of Machine Learning related ITU-T Supplement 55 to Y.3170-series, TSG SA4#107 meeting, Jan. 20-24, 2020, Wroclaw, Poland, S4-200017.

* cited by examiner

WIRELESS COMMUNICATION SYSTEM AND METHOD FOR PERFORMING COMMUNICATION AND COMPUTING

CROSS-REFERENCE TO RELATED APPLICATION(S)

The present disclosure claims the benefit of and priority to provisional U.S. Patent Application Ser. No. 63/090,637 ("the '637 provisional"), filed on Oct. 12, 2020, entitled "6G COMMUNICATION SYSTEM". The contents of the '637 provisional are fully incorporated herein by reference for all purposes.

FIELD

The present disclosure is generally related to wireless communications, and specifically, to a wireless communication system and method for performing communication and computing.

BACKGROUND

With the tremendous growth in the number of connected devices and the rapid increase in user/Network (NW) traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the NW services and types, accommodating various use cases such as Enhanced Mobile Broadband (eMBB), Massive Machine-Type Communication (mMTC), and Ultra-Reliable and Low-Latency Communication (URLLC).

However, based on 5G/NR structure, it is anticipated by users/operators/manufacturers to construct another advanced/new wireless communication system and/or technology as the demand for more radio access resources and better performance while performing communication and computing.

SUMMARY

The present disclosure is directed to methods and user equipment (UE) for performing communication and computing.

In a first aspect of the present application, a wireless communication system for performing communication and computing is provided. The wireless communication system includes a plurality of cells configured to perform the communication between at least one user equipment (UE) and at least one network (NW); and an Artificial Intelligence (AI) computing platform comprising a plurality of AI slices to perform the computing, wherein the plurality of cells are located in air, space, sea or land.

In another implementation of the first aspect, the AI computing platform comprises a plurality of first AI slices, a plurality of second AI slices and at least one third AI slice.

In another implementation of the first aspect, the plurality of first AI slices are computed in the plurality of cells, the at least one UE and the at least one NW; the plurality of second AI slices are computed and communicated between each of the plurality of cells and the at least one UE and between each of the plurality of cells and the at least one NW; and the at least one third AI slice is computed and communicated between the at least one NW and the at least one UE.

In another implementation of the first aspect, the plurality of cells support a same frequency band if the plurality of cells are located in each of the space, air, sea and land.

In another implementation of the first aspect, the at least one UE selects one of the plurality of cells based on at least one of an intra-frequency measurement, an inter-frequency measurement, a latency requirement and a slice selection corresponding to each of the plurality of AI slices.

In another implementation of the first aspect, each of the computing is determined based on a UE capability, UE preference assistance information, or a user plane optimization.

In a second aspect of the present application, a method, performed by a wireless communication system, for performing communication and computing is provided. The method includes configuring a plurality of cells to perform the communication between at least one user equipment (UE) and at least one network (NW); and performing, via an Artificial Intelligence (AI) computing platform comprising a plurality of AI slices, computing, wherein the plurality of cells are located in air, space, sea, or land.

In a third aspect of the present application, a User Equipment (UE) in a wireless communication system for performing communication and computing is provided. The UE includes a processor; an Artificial Intelligence (AI) slice coupled to the processor; and a memory coupled to the processor, wherein the memory stores a computer-executable program that, when executed by the processor, causes the processor to perform the computing via the AI slice; and perform the communication to at least one network (NW) via one of a plurality of cells, wherein the plurality of cells are located in air, space, sea, or land, and the wireless communication system comprises an AI computing platform configured to cooperate with the AI slice of the UE.

BRIEF DESCRIPTION OF THE DRAWINGS

Aspects of the present disclosure are best understood from the following when read with the accompanying figures. Various features are not drawn to scale. Dimensions of various features may be arbitrarily increased or reduced for clarity of discussion.

DESCRIPTION

Figure 1:
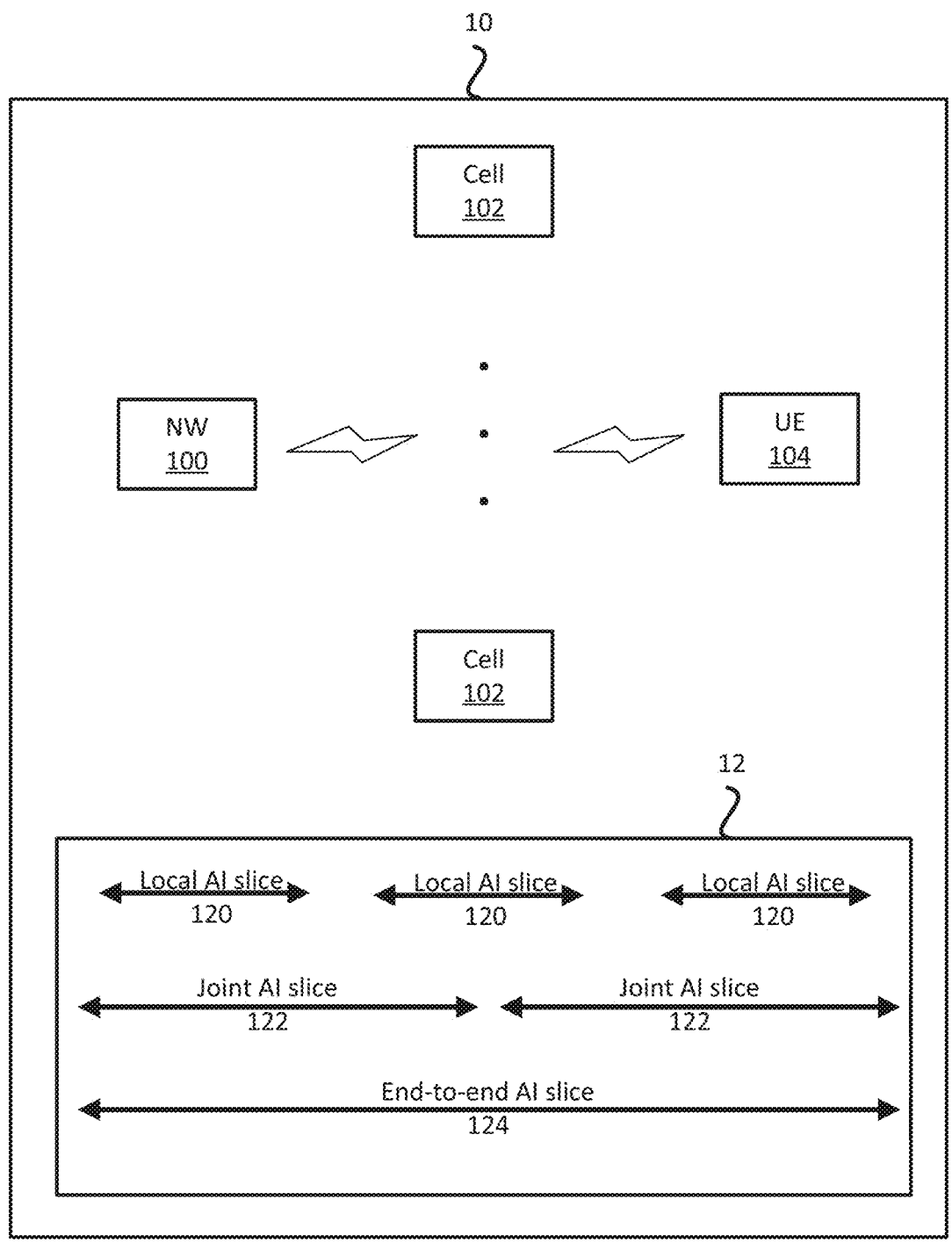
FIG. 1 illustrates a block diagram of a wireless communication system for 6G communication according to an implementation of the present disclosure.

The acronyms in the present disclosure are defined as follows. Unless otherwise specified, the acronyms have the following meanings.

Acronym Full name
　3GPP 3$^{rd}$ Generation Partnership Project
　AI Artificial Intelligence
　AR Augmented Reality
　BS Base Station
　CE Control Element
　CPU Central Processing Unit
　CN Core Network
　DL Downlink
　gNB g Node B
　ID Identity
　IoT Internet of Things
　IPv4/v6 Internet Protocol Version 4/6
　LTE Long Term Evolution
　MAC Medium Access Control
　MCG Master Cell Group
　MR Mixed Reality
　NR New Radio
　NW Network
　PCell Primary Cell
　PDU Protocol Data Unit
　PSCell Primary Secondary Cell
　PUSCH Physical Uplink Shared Channel
　QoS Quality of Service
　RAN Radio Access Network
　RRC Radio Resource Control
　RSRP/RSRQ Reference Symbol Received Power/Quality
　SCell Secondary Cell
　SCG Secondary Cell Group
　SDU Service Data Unit
　SI System Information
　SpCell Special Cell
　SR Scheduling Request
　UE User Equipment
　UL Uplink
　VR Virtual Reality The following contains specific information pertaining to implementations of the present disclosure. The drawings and their accompanying detailed disclosure are directed to merely exemplary implementations. However, the present disclosure is not limited to these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure may include a particular feature, structure, or characteristic, but not every possible implementation of the present disclosure necessarily includes the particular feature, structure, or characteristic. Further, repeated use of the phrase "in one implementation," "in an example implementation," or "an implementation," do not necessarily refer to the same implementation, although they may. Moreover, any use of phrases like "implementations" in connection with "the present disclosure" are not meant to characterize that all implementations of the present disclosure must include the particular feature, structure, or characteristic, and should instead be understood to mean "at least some implementations of the present disclosure" includes the stated particular feature, structure, or characteristic.

The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-disclosed combination, group, series, and the equivalent.

The term "and/or" is only an association relationship for describing associated objects, and represents that three relationships may exist, for example, A and/or B may represent that: A exists alone, A and B exist at the same time, and B exists alone. "A and/or B and/or C" may represent that at least one of A, B and C exists. In addition, the character "/" generally represents that the former and latter associated objects are in an "or" relationship.

Additionally, for the purpose of non-limiting explanation, specific details, such as functional entities, techniques, protocols, standards, and the like, are set forth for providing an understanding of the disclosed technology. In other examples, a detailed disclosure of well-known methods, technologies, systems, architectures, and the like are omitted in order not to obscure the present disclosure with unnecessary details.

Persons skilled in the art will immediately recognize that any NW function(s) or algorithm(s) in the present disclosure may be implemented by hardware, software, or a combination of software and hardware. Disclosed functions may correspond to modules that may be software, hardware, firmware, or any combination thereof. The software implementation may comprise computer-executable instructions stored on computer-readable media such as memory or other types of storage devices.

For example, one or more microprocessors or general-purpose computers with communication processing capability may be programmed with corresponding executable instructions and carry out the disclosed NW function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations in the present disclosure are directed to software installed and executing on computer hardware, alternative example implementations implemented as firmware or as hardware or combination of hardware and software are well within the scope of the present disclosure.

The computer-readable medium includes but is not limited to Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication NW architecture (e.g., a LTE system, an LTE-Advanced (LTE-A) system, or an LTE-Advanced Pro system) typically includes at least one BS, at least one UE, and one or more optional NW elements that provide connection towards an NW. The UE communicates with the NW (e.g., a CN, an Evolved Packet Core (EPC)

NW, an Evolved Universal Terrestrial Radio Access NW (E-UTRAN), a Next-Generation Core (NGC), a 5G Core (5GC) Network, an Internet or a six generation (6G) NW), through a RAN established by the BS/Cell.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a RAN.

A BS may include, but not limited to, a Node B (NB) as in the Universal Mobile Telecommunication System (UMTS), an evolved Node B (eNB) as in the LTE-A, a Radio NW Controller (RNC) as in the UMTS, a Base Station Controller (BSC) as in the Global System for Mobile communications (GSM)/GSM EDGE (Enhanced Data rates for GSM Evolution) Radio Access NW (GERAN), a Next Generation eNB (ng-eNB) as in an E-UTRA BS in connection with the 5GC, a gNB as in the 5G Access NW (5G-AN), and any other apparatus (e.g., in 6G communication system) capable of controlling radio communication and managing radio resources within a cell. The BS may connect to serve the one or more UEs through a radio interface to the NW.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), LTE-A Pro, and a next generation (e.g., 6G) RAT. However, the scope of the present disclosure should not be limited to the protocols previously disclosed.

The BS may be operable to provide radio coverage to a specific geographical area using a plurality of cells included in the RAN. The BS may support the operations of the cells. Each cell is operable to provide services to at least one UE within its radio coverage. More specifically, each cell (often referred to as a serving cell) may provide services to serve one or more UEs within its radio coverage, (e.g., each cell schedules the DL and optionally UL resources to at least one UE within its radio coverage for DL and optionally UL packet transmissions). The BS may communicate with one or more UEs in the radio communication system through the plurality of cells. A cell may allocate sidelink (SL) resources for supporting proximity service (ProSe). Each cell may have overlapped coverage areas with other cells.

In Multi-RAT Dual Connectivity (MR-DC) cases, the primary cell of an MCG or a SCG may be called as a SpCell. A PCell may refer to the SpCell of an MCG. A PSCell may refer to the SpCell of an SCG. MCG refers to a group of serving cells associated with the Master Node (MN), comprising the SpCell and optionally one or more SCells. SCG refers to a group of serving cells associated with the Secondary Node (SN), comprising of the SpCell and optionally one or more SCells.

In some implementations, the UE may not have (LTE/NR) RRC connections with the concerned serving cells of the associated services. In other words, the UE may not have UE-specific RRC signalings exchange with the serving cell. Instead, the UE may only monitor the DL synchronization signals (e.g., DL synchronization burst sets) and/or broadcast SI related to the concerned services from such serving cells. In addition, the UE may have at least one serving cell on one or more target SL frequency carriers for the associated services. In some other implementations, the UE may consider the RAN which configures one or more of the serving cells as a serving RAN.

As previously disclosed, the frame structure for NR supports flexible configurations for accommodating various next generation (e.g., 5G and/or 6G) communication requirements, such as eMBB, mMTC, and URLLC, while fulfilling high reliability, high data rate, and low latency requirements. The OFDM technology, as disclosed in 3GPP, may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or service applications.

It is also considered that in a transmission time interval of a single NR frame, at least DL transmission data, a guard period, and UL transmission data should be included. The respective portions of the DL transmission data, the guard period, the UL transmission data should also be configurable, for example, based on the NW dynamics of NR. In addition, SL resources may also be provided in an NR frame to support ProSe services.

In some implementation, the present disclosure may propose a conceptional/advanced wireless communication system and method thereof, e.g., 6G communication system and technology thereof (shortly called the 6G communication system), that mainly focuses on the capability exchange and configuration coordination protocol between the UE and the NW. More specifically, depend on user's requirements, location and/or environments, a personalized intelligence slice and/or security mechanism is introduced to meet the local and/or end-to-end user experience.

For wireless communication development, the 6G communication system may target on marketing and commercialization in recent years. In addition, a relative operating frequency is under discussion by International Telecommunication Union Radiocommunication Sector (ITU-R) and corresponding applications are widely and extensively explored after 2020. However, the current 5G communication system for different applications/perspectives/dimensions are still necessary to achieve a performance with high data rate, low latency, and massive connections for fulfilling the IoT. More practical applications are also under constructing with great improvement based on the current system or structure. Thus, it is optimistic for users to anticipate that the 6G communication system may be largely deployed with an better framework for meeting advanced consumer application (e.g., from business to consumer) from user' perspectives.

Please refer to FIG. 1, which illustrates a block diagram of a wireless communication system 10 for 6G communication according to an implementation of the present disclosure. As shown in FIG. 1, the wireless communication system 10 supporting the 6G communication includes at least one NW 100, a plurality of cells 102 and at least one UE 104. Furthermore, the wireless communication system 10 includes an AI computing platform 12 that includes a plurality of AI slices to be incorporated inside/between the at least one NW 100, the plurality of cells 102 and the at least one UE 104. As that, the wireless communication system 10 may configure the NW 100, the cells 102 and the UE 104 to perform communication and computing based on an integral method/algorithm/solution/approach/function that is dividable into pieces to be installed/pre-configured/stored/configured inside at least one of the NW 100, the cells 102 and the UE 104. More details will be introduced in the following.

Figure 2:
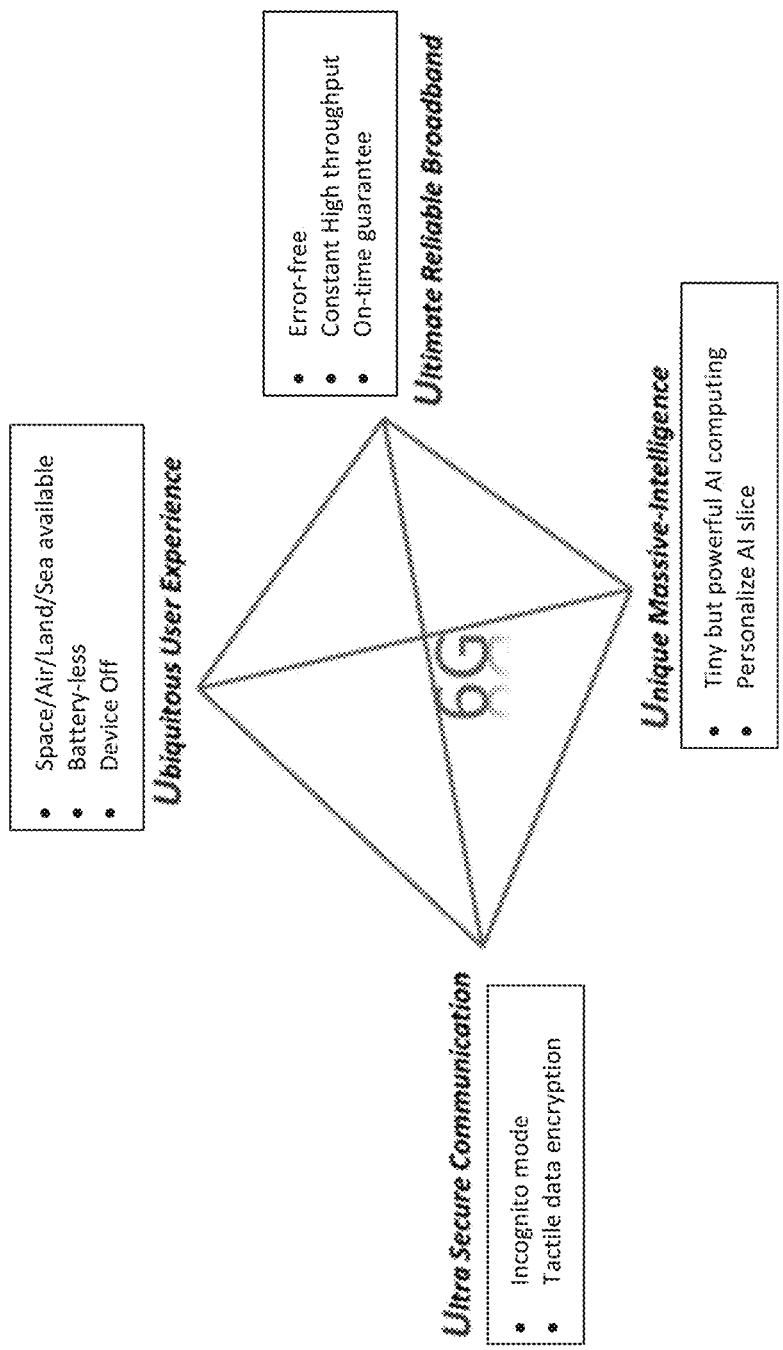
FIG. 2 illustrates a schematic block diagram of proposed features for the wireless communication system supporting the 6G communication according to an implementation of the present disclosure.
Figure 3:
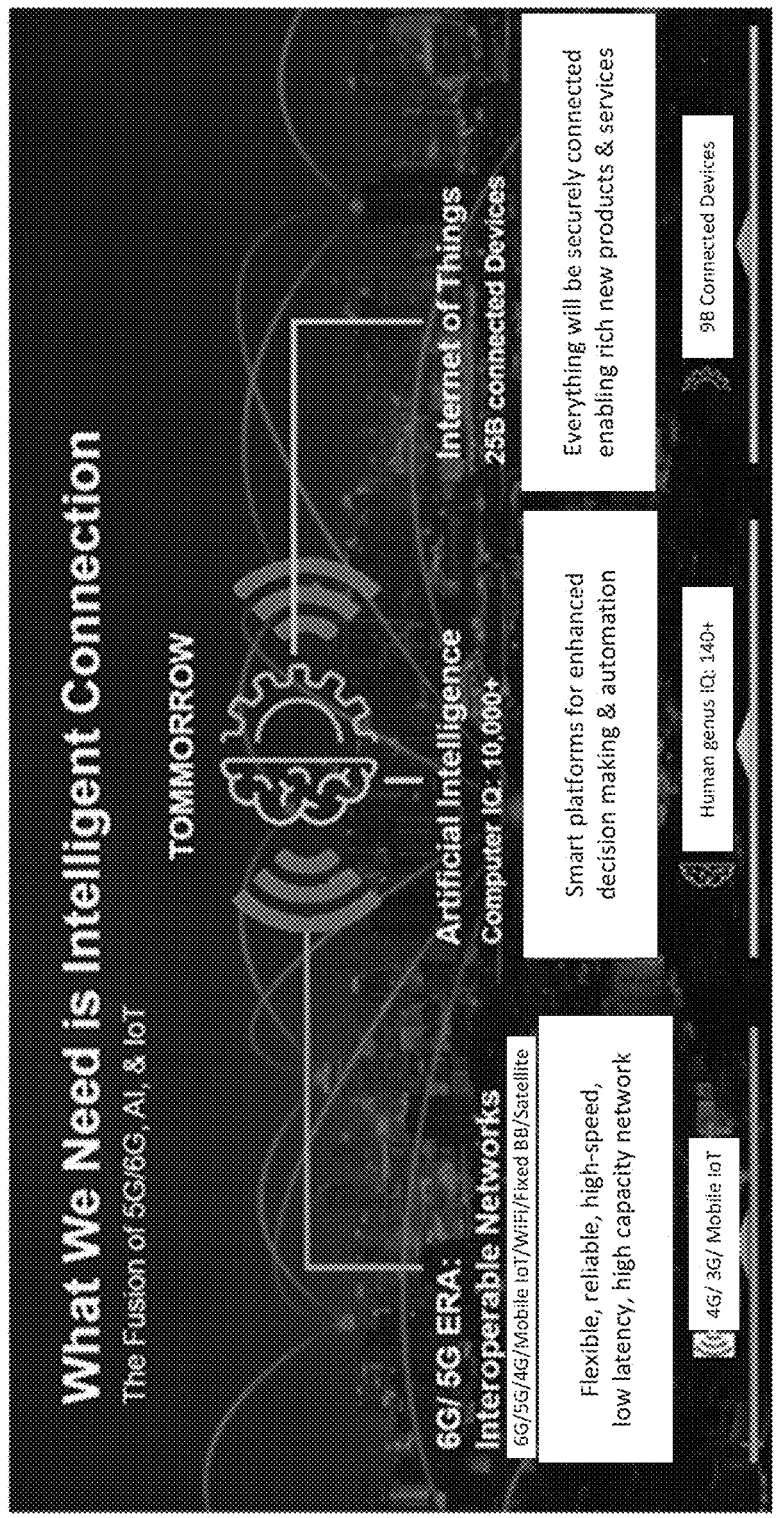
FIG. 3 illustrates a schematic diagram of additional features and approaches for the 6G communication according to an implementation of the present disclosure.

Please refer to FIGS. 2 and 3, where FIG. 2 illustrates a schematic block diagram of proposed features for the wireless communication system 10 supporting the 6G communication according to an implementation of the present disclosure, and FIG. 3 illustrates a schematic diagram of additional features and approaches for the 6G communication according to an implementation of the present disclosure. As shown in FIGS. 1 and 2, the present disclosure at least demonstrates the following 4U features for the wireless communication system 10 supporting the 6G communication, for example, the ubiquitous user experience, the ultimate reliable broadband, the unique massive intelligence and the ultra-secure communication. Also, a general fusion of 5G, 6G, AI and IoT is illustrated in FIG. 3 to illustrate a fundamental structure with more anticipations and connections in view of intelligent characteristics/factors.

In some implementations, the ubiquitous user experience is introduced with the following three perspectives. First, considering multi-layer coverage introduced by the 5G communication (e.g., using different operating frequencies which result in respective communication coverage and some of them are overlapped/partial overlapped/non-overlapped with each other to enforce multi-layer coverage), users may not flexibly utilize the 5G communication everywhere. Accordingly, the wireless communication system 10 may be expected by users to support at various places with always-available coverage in space, air, land, sea and any kind of spatial/geographical areas and environments.

Second, high throughput may result in high power consumption, such that it is imperative to find a green solution/technology for the wireless communication system 10 and users may use requested wireless services with less battery consumption. While considering some existing solutions/technologies (e.g., DRX, inactive state) under the 5G communication, it is important to incorporate and utilize the above solutions/technologies with additional green solutions/technologies into the wireless communication system 10 while performing the communication upon different user's behaviors/conditions.

Third, it may not be healthy for users to carry/hand on one mobile device and stare at his/her screens all the time. Thus, the wireless communication system 10 may be capable of constructing a virtual interface, such that users may control/operate his(her) UE in a healthier way. In one example, a XR (e.g., AR, VR, MR and/or Substitutional Reality) and tactile sensor may be applied onto an interface of at least one of the NW 100, cells 102 and the UE 104 (or other operating unit(s) not shown in FIG. 1) in the wireless communication system 10.

In some implementations, the ultimate reliable broadband is introduced with the following two perspectives. First, although the 5G communication is compatible to provide high data rate and low latency, the data rate is variable based on the operating frequency and bandwidth. As that, the wireless communication system 10 may need to improve performance for the communication (e.g., the 6G communication) while both considering latency and reliability thereof. Second, it is anticipated that the wireless communication system 10 may be able to offer a stable communicating performance against the throughput, packet error rate and latency and precisely focus on requirements of the users.

In some implementations, the unique massive intelligence is introduced in the following. Specifically, AI applications may be imperative among most of social activities through wireless communication in the near future. In order to realize/customize feasible AI usage, more complicated and massive (AI) computing may be applied into the wireless communication system 10 to analyze large data volume. Accordingly, the AI computing platform 12 may be configured inside the wireless communication system 10 to perform the plurality of (AI) computing. In one example, the NW 100 may be composed of at least one cloud switches and at least one core router. As that, the AI computing platform 12 may configure/control the at least one NW 100, the plurality of cells 102 and the at least one UE 104 to compute/share/exchange/cooperate tasks of the plurality of (AI) computing. In another example, due to different hardware capability and/or stored information, the AI computing platform 12 may also divide/split all the plurality of (AI) computing into different slices/entities that correspond to the at least one NW 100, the plurality of cells 102 and the at least one UE 104, and synchronize, exchange and/or converge tasks of the above different slices/entities to obtain a final computing result via wireless connection/communication.

In one implementation, the AI computing platform 12 may be composed of a plurality of first AI slices, a plurality of second AI slices and at least one third AI slice. Specifically, the plurality of first AI slices may be a plurality of local AI slices 120 to be computed internally in at least one entity. The plurality of second AI slices may be a plurality of joint AI slices 122 to be computed across different entities. The at least one third AI slice may be one end-to-end AI slice 124 to be globally computed in the wireless communication system 10. In one example, the plurality of first AI slices may be a plurality of local AI slices that are computed in the plurality of cells 102, the at least one UE 104 and the at least one NW 100. The plurality of second AI slices may be a plurality of joint AI slices that are computed and communicated between each of the plurality of cells 102 and the at least one UE 104 and/or between each of the plurality of cells 102 and the at least one NW 100, where the computing and/or the communication represent the data/algorithm/process/function/method/solution/service/application that may be computed and to generate at least one computed result(s) that may be exchanged between each entity. The at least one third AI slice may be an end-to-end AI slice, which is computed and communicated between the at least one NW 100 and the at least one UE 104 or may be allocated everywhere to access/forward/exchange at least one result of the (AI) computing requested by one unit inside the wireless communication system 10. Since different users may have different requirements of the (AI) computing (e.g., the above the plurality of local AI slices, the plurality of joint AI slices or the at least one end-to-end AI slice), it is not practical to allocate the same resource/NW function and/or entity to all users. Accordingly, different AI slices may be configured to different parts of the wireless communication system 10 based on different functions/services/applications that may correspondingly initiate the (AI) computing and setup the connection for the 6G communication, such that each user can have his/her specific AI slice that can be re-configured while different functions/services/applications are activated/deactivated. Noted that the specific AI slice may be simultaneously applied or activated/deactivated accordingly.

In some implementations, the ultra-secure communication is introduced with the following two perspectives. First, for IoT applications of the wireless communication system 10, the data may be kept and gathered to support further usage, where some private or personal data may be released and/or created with some security concerns. Thus, while introducing the conception to design the 6G communication of the wireless communication system 10, the user may switch on (or off) a security/incognito mode of the UE 104 for corresponding data storage. If the UE 104 is switched on into the security/incognito mode, the stored data may be erased/deleted while a setting timer is expired. In one example, the operation of erasing may mean that the packet/PDU/SDU/data session can be discard/delete/erase from the UE 104, the cell 102 and/or the NW 100. In another example, the setting timer may be configured with a fixed/configured value, or the setting timer may be relied on one running functions/services/applications on the UE 104 (or the cell 102/NW 100).

Second, in some implementations, an encryption mechanism/mode may also be configured/used for the wireless communication system 10. In one example, a tactile signaling, such as a fingerprint of a transmitter and/or receiver, may be served as a security key to encrypt the corresponding transmission/packets/data, so that both users (i.e., transmitter and receiver) in the wireless communication system 10 may participate to decode the transmission/packets/data. Without the right security key, no one can successfully acquire the transmission/packets/data communicated in the wireless communication system 10.

In some implementations, a cell selection may be configured/used for the wireless communication system 10. In one example, an S-criteria strategy that includes intra-frequency and inter-frequency measurement may be applied to precisely select one of the plurality of cells 102. If users locate or enter different areas/environments (e.g., space or sea), the UE 104 may be applied with different cell selection mechanisms/strategies for selecting one of the plurality of cells 102. In another example, the cell(s) 102 allocated in the space may have wider coverage than the cell(s) 102 allocated in the land.

In one implementation, a latency requirement may be configured/used for the wireless communication system 10. In one example, latency performance may be different (due to long propagation distance) even if the same RSRP/RSRQ result is obtained/measured by the UE 104. Accordingly, the cells 102 may be configured to broadcast their corresponding location information via the SI or via a dedicated signaling. When the UE 104 receives the location information corresponding to the cells 102, the UE 104 may be configured/applied different cell selection mechanisms/strategies.

In one implementation, the location information may be appended in other SI. In one implementation, the location information may be 2 bits with different value corresponding to different areas/environments. In one example, the default value of the location information may be '00' that labels the location being in the land. In another example, if the UE 104 does not receive the location information, the UE 104 may assume that the cell 102 is deployed upon the land. In one implementation, additional parameters related to or associated with different areas/environments may also be appended to the location information, and the UE 104 may be configured to apply/recognize the additional parameters. In one implementation, the location information may be valid per cell and/or per specific area/environment, where corresponding value tag(s) and/or area ID(s) may be used for verification/authorization.

In some implementations, (NW) slices has been applied/utilized in the 5G communication and the UE may select the proper cell based on one preferred slice. While one UE camp on an inappropriate cell (e.g., the cell can't support one preferred slice of the UE), the cell may send a cell redirection command to the UE. As that, for a plurality of slices of the wireless communication system 10, the AI computing platform 12 may be utilized/configured with a two-level slice selection function/mechanism (or shortly called a slice selection including a AI slice selection and a NW slice selection, where the AI slice selection is for the (AI) computing and the NW slice selection is for the communication) due to different purpose/function/behavior of the slices, where the slices may be functionally divided into two kinds of slices, e.g., one kind of AI slices being associated with and/or computed/communicated for the AI application and another kind of NW slices being associated with and/or computed/communicated for the general application (i.e., no requirement for AI application). Specifically, under configuration of the AI computing platform 12, the UE 104 may first perform a NW slice selection, and then perform a AI slice selection; alternatively, the UE 104 may perform the AI slice selection before performing the NW slice selection.

In one example, the cell 102 may redirect the UE 104 to other cells 102 when either the AI slice or the NW slice cannot be fulfilled. In another example, the cell 102 may redirect the UE 104 to other cells 102 when both the AI slice and the NW slice cannot be fulfilled. In another example, the AI slice selection and the NW slice selection may be adjusted per operating frequency. In another example, the UE 104 may define/recognize preferred slice and/or intended slice by the requirements and perform the slice selection based on such preference/intention or other limitations. In another example, the UE 104 may discard the two-level slice selection function/mechanism for a while if there is no other cell(s) can support its intended/preferred AI slice/NW slice. As that, the discard conditions may include:
  (a) more than N cells may be not fulfilled its requirement; and
  (b) no acceptable cells during a T period,
  where values of N and/or T may be configured by the NW 100 (e.g., via the SI) or pre-defined. Noted that while the two-level slice selection is discarded, the UE 104 may turn to utilize a legacy cell selection that may only consider the NW slice selection. If the UE 104 reports its capability that indicates no support of the AI slice selection, the UE 104 may default to follow the legacy cell selection and apply its corresponding behavior(s).

In some implementations, an access barring function/solution may be configured/used for the wireless communication system 10 to control congestion issue in at least one heavy loading cell. Specifically, the cell 102 may provide different access classes, and accordingly, the corresponding UE 104 may adopt proper parameters to perform the access barring function/solution. In one example, an access failure cause may trigger the AI slice(s) to consider influences of different areas/environments. In another example, while the UE 104 receives one access failure cause, different cell reselection strategy may be correspondingly applied/triggered for the UE 104. In another example, the access barring function/solution may be classified into different access barring classes, where a number of access barring class may be adaptively adjusted/increased while considering different service types or different UE/AI capability. In another example, a scale factor may be additionally applied to different AI slices, e.g., to bar/prohibit/prevent specific kind(s) of UE for a longer/shorter period.

In some implementations, a UE capability negotiation function/solution may be used/configured for the wireless communication system 10. Specifically, after the UE 104 has registered to the NW 100 via the cell 102, the NW 100 may request the UE 104 to indicate its corresponding capability information. The capability information may include the following:
  (a) computing capability, which may be indicated via different levels (e.g., high/medium/low) or via a specific value (e.g., numbers of CPU core);
  (b) computing latency, which may be indicated via different levels (e.g., short/medium/long) or via a specific value (e.g., the amount of period/ms or how many of sub-frame(s));
  (c) capability to connect with cell(s) in space/air/land/sea, where a bitmap indication may be used to represent the feasibility to camp on the deployed cell(s);
  (d) capability to support a special security mode, where the indication may include exchanging operating parameters on an incognito mode and/or a tactile encryption function;
  (e) capability to support band combination profile, where band combination may be used to indicate which band(s) one UE may be operated. In addition, it is proposed to jointly utilize the band combination in different areas/environments. For instance, one band combination may be feasible in land but may not be feasible in sea. Accordingly, more adjustments/parameters accompanying with the band combination profile may be utilized to indicate such restriction/requirement.
  (f) capability to indicate whether one UE supports touchable interface and/or screen. By identifying/receiving such capability of the UE, the NW may determine how to provide on-time guarantee services, and the NW can precisely configure a power saving mode and/or resource allocation to the UE based on such hardware limitation of the UE.

In some implementations, a UE preference assistance information may be configured/used for the wireless communication system 10. Under the 5G communication/technology, although one UE may be capable of providing its preference information to one NW, the NW may not necessarily consider such preference information from the UE for further operation. As that, in one implementation, the UE preference assistance information may be applied to the wireless communication system 10 to identify/label different priorities due to various features/environments of the NW 100/cell 102/UE 104. While receiving the UE preference assistance information from the UE 104, the NW 100 may be aware of which portion should be configured, such that less transmission/packet conflict for resource allocation may be anticipated. In one example, the UE 104 may utilize/label one 'high/medium/low' level for the UE preference assistance information. In another example, if no corresponding label/level appears or finds in the UE preference assistance information, one default level may be pre-configured with one 'low' level.

In another implementation, while utilizing a RRC message, the UE 104 may be configured to adaptively adjust the UE preference assistance information through a MAC CE or one specific SR resource. Specifically, the UE 104 may send its UE preference assistance information with one index through the RRC message, and accordingly, the NW 100 may receive/consider the index of the UE preference assistance information to correspondingly configure mapping PUSCH resource(s). As that, the UE 104 may implicitly indicate the UE preference assistance information for utilizing the configured PUSCH resource(s).

In some implementations, a user plane optimization may be configured/used for the wireless communication system 10. Since either IPv4 or IPv6 has its header, payload and a fixed head format that is used for indicating a routing policy/protocol, only one routing may not be sufficient while utilizing/applying different NWs (e.g., satellite NW, sea NW) together for different intrinsic characteristic. In one implementation, a variable length for the header may be configured/utilized for the wireless communication system 10 to have a new address format, so as to identify different regions with different identifications. In one example, the region may be configured by the NW 100 based on transmission latency, loading and/or coverage. In another example, some fields of the header may be absent, and one reception unit (e.g., the NW 100 or the UE 104) may identify/recognize such changes in an implicit way. In another example, the length for the header may be configured by the NW 100 based on the location of the cell(s) 104 and a NW size.

In one implementation, assuming a same source coding being used for the payload, different environments/areas may have different transmission error rate, and accordingly, it is better to jointly consider channel coding and source coding for different environments/areas, so as to apply different coding/packet construction and to fit an qualitative requirement. Thus, different multiplexing and segment solutions/mechanisms may be introduced for the wireless communication system 10 and performed in different transmission resources/channels/nodes. In one example, the wireless communication system 10 may not be required to apply the same multiplexing and segment solution/mechanism while the transmission is occurred in multiple hops.

In one implementation, an QoS profile may be pre-defined during packet transmission, but it is difficult to define QoS requirements in advanced due to heterogenous NWs. Thus, an adaptive agreement/solution may be configured/used for the wireless communication system 10 to assist the communication between the UE 104 and the NW 100, so as to define the QoS requirement in time and to meet the environment/area of the NW and its corresponding transmission quality. In one example, the adaptive agreement/solution may be predefined or adjusted cases by cases with different criteria.

Figure 4:
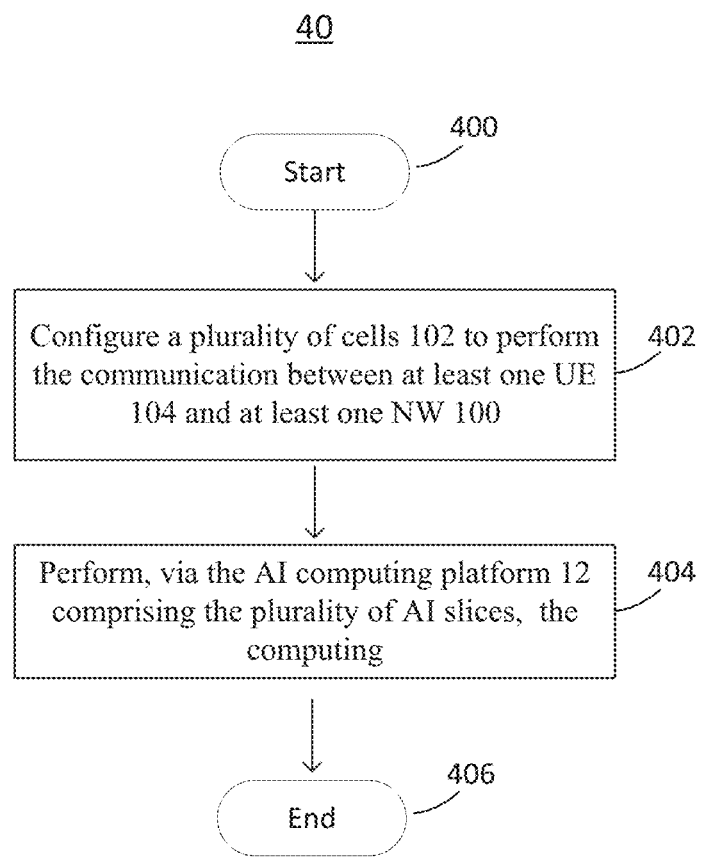
FIG. 4 illustrates a procedure for performing communication and computing in the wireless communication system according to an implementation of the present disclosure.

Please refer to FIG. 4, which illustrates a procedure 40 for performing communication and computing in the wireless communication system 10 according to an implementation of the present disclosure. As shown in FIG. 4, the procedure 40 for the wireless communication system 10 may include the following actions:
Action 400: Start.
Action 402: Configure a plurality of cells 102 to perform the communication between at least one UE 104 and at least one NW 100.
Action 404: Perform, via the AI computing platform 12 comprising a plurality of AI slices, the computing.
Action 406: End.

Preferably, action 402 to action 404 of the procedure 40 may be performed by the NW 100, the cells 102 and/or the UE 104 in the wireless communication system 10 via the 6G communication. In some implementations, the plurality of cells 102 may be configured to perform the communication between the at least one UE 104 and the at least one NW 100 in action 402. In action 404, the AI computing platform 12 may be configured to perform the computing. In some implementations, the plurality of cells 102 may be located among in space or air or sea or land, and support a same or different frequency band in a case the plurality of cells 102 are located in the space, air, sea and land. In some implementations, the at least one UE 104 may select one of the plurality of cells 102 based on at least one of the intra-frequency, the inter-frequency measurement, the latency requirement and the slice selection corresponding to each of the plurality of AI slices of the AI computing platform 12. In some implementations, each of the computing may be determined/initiated/performed based on the UE capability, the UE preference assistance information or the user plane optimization by the NW 100/cell 102/UE 104. Certainly, more detail mechanisms and/or operations (e.g., action 402 to action 404) of the procedure 40 are described in above paragraphs and neglected hereinafter for brevity.

Figure 5:
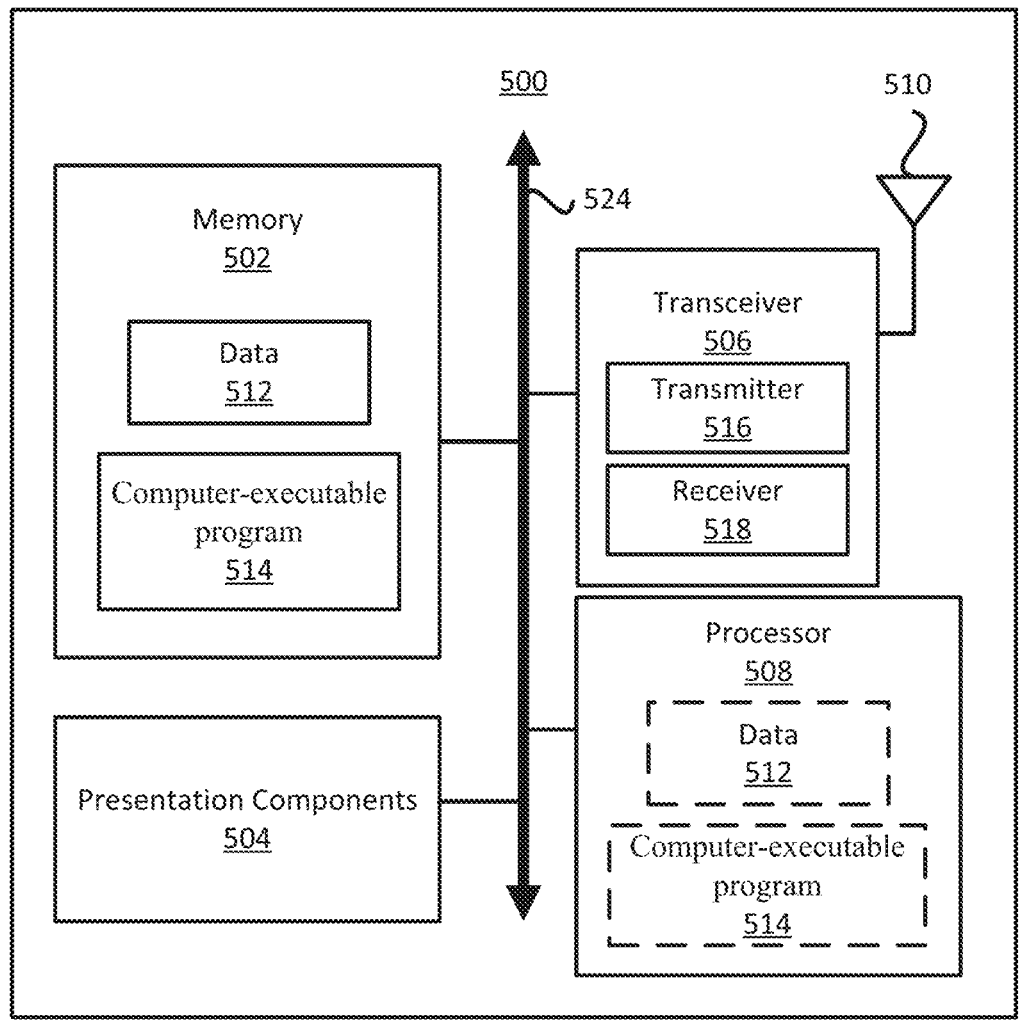
FIG. 5 illustrates a block diagram of a node for wireless communication according to an implementation of the present disclosure.

Please refer to FIG. 5, which illustrates a block diagram of a node 500 for wireless communication according to an implementation of the present disclosure. As illustrated in FIG. 5, the node 500 includes a transceiver 506, a processor 508, a memory 502, one or more presentation components 504, and at least one antenna 510. The node 500 may also include a Radio Frequency (RF) spectrum band module, a BS communications module, an NW communications module, and a system communications management module, input/output (I/O) ports, I/O components, and power supply (not explicitly illustrated in FIG. 5). Each of these components may be in communication with each other, directly or indirectly, over one or more buses 524. The node 500 may be a UE, a NW, a cell/BS or any operating entity in the wireless communication system 10 that performs various functions disclosed herein, for example, with reference to FIG. 4.

The transceiver 506 includes a transmitter 516 (e.g., transmitting/transmission circuitry) and a receiver 518 (e.g., receiving/reception circuitry) and may be configured to transmit and/or receive time and/or frequency resource partitioning information. The transceiver 506 may be configured to transmit in different types of subframes and slots, including, but not limited to, usable, non-usable and flexibly usable subframes and slot formats. The transceiver 506 may be configured to receive data and control channels.

The node 500 may include a variety of computer-readable media. Computer-readable media may be any available media that may be accessed by the node 500 and include both volatile (and non-volatile) media and removable (and non-removable) media. By way of example, and not limitation, computer-readable media may include computer storage media and communication media. Computer storage media may include both volatile (and non-volatile) and removable (and non-removable) media implemented according to any method or technology for storage of information such as computer-readable.

Computer storage media includes RAM, ROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media does not include a propagated data signal. Communication media may typically embody computer-readable instructions, data structures, program modules, or other data in a modulated data signal such as a carrier wave or other transport mechanism and include any information delivery media.

The term "modulated data signal" may refer to a signal that has one or more of its characteristics set or changed in such a manner as to encode information in the signal. By way of example, and not limitation, communication media may include wired media such as a wired NW or direct-wired connection, and wireless media such as acoustic, RF, infrared and other wireless media. Combinations of any of the previous disclosure should also be included within the scope of computer-readable media.

The memory 502 may include computer-storage media in the form of volatile and/or non-volatile memory. The memory 502 may be removable, non-removable, or a combination thereof. For example, the memory 502 may include solid-state memory, hard drives, optical-disc drives, etc.

As illustrated in FIG. 5, the memory 502 may store a computer-executable (or readable) program 514 (e.g., software codes) that are configured to, when executed, cause the processor 508 to perform various functions disclosed herein, for example, with reference to FIG. 5. Alternatively, the computer-executable program 514 may not be directly executable by the processor 508 but may be configured to cause the node 500 (e.g., when compiled and executed) to perform various functions disclosed herein.

The processor 508 (e.g., having processing circuitry) may include an intelligent hardware device, a CPU, a microcontroller, an ASIC, etc. The processor 508 may include memory. The processor 508 may process the data 512 and the computer-executable program 514 received from the memory 502, and information received via the transceiver 506, the baseband communications module, and/or the NW communications module. The processor 508 may also process information to be sent to the transceiver 506 for transmission through the antenna 510 to the NW communications module for subsequent transmission to a CN.

One or more presentation components 504 may present data to a person or other device. Examples of presentation components 504 may include a display device, speaker, printing component, vibrating component, etc.

From the present disclosure, it is manifested that various techniques may be used for implementing the disclosed concepts without departing from the scope of those concepts. Moreover, while the concepts have been disclosed with specific reference to certain implementations, a person of ordinary skill in the art would recognize that changes may be made in form and detail without departing from the scope of those concepts. As such, the disclosed implementations are to be considered in all respects as illustrative and not restrictive. It should also be understood that the present disclosure is not limited to the particular disclosed implementations. Many rearrangements, modifications, and substitutions are possible without departing from the scope of the present disclosure.

What is claimed is:

1. A wireless communication system for performing communication and computing, the wireless communication system comprising:
   a plurality of cells configured to perform the communication between at least one user equipment (UE) and at least one network (NW); and
   an Artificial Intelligence (AI) computing platform comprising a plurality of AI slices to perform the computing and a plurality of NW slices to perform the communication,
   wherein:
   the plurality of cells is located in any one of air, space, sea, or land,
   each of the plurality of AI slices is configured to a respective part of the wireless communication system,
   each of the plurality of AI slices is activated or deactivated after being configured, the AI computing platform is configured with a two-level slice selection in which an AI slice selection and a NW slice selection are performed respectively in a predefined order,
the AI slice selection is associated with the plurality of AI slices,
the NW slice selection is associated with the plurality of NW slices, and
the at least one UE selects one of the plurality of cells based on the predefined order of performing at least one of the AI slice selection and the NW slice selection.

2. The wireless communication system according to claim 1, wherein the plurality of AI slices comprises a plurality of first AI slices, a plurality of second AI slices, and at least one third AI slice.

3. The wireless communication system according to claim 2, wherein:
the plurality of first AI slices is computed in the plurality of cells, the at least one UE, and the at least one NW,
the plurality of second AI slices is computed and communicated between each of the plurality of cells and the at least one UE and between each of the plurality of cells and the at least one NW, and
the at least one third AI slice is computed and communicated between the at least one NW and the at least one UE.

4. The wireless communication system according to claim 1, wherein the plurality of cells supports a same frequency band in a case that the plurality of cells is located in each of the space, air, sea, and land.

5. The wireless communication system according to claim 1, wherein selecting one of the plurality of cells is performed based on at least one of an intra-frequency measurement, an inter-frequency measurement, and a latency requirement.

6. The wireless communication system according to claim 1, wherein the computing performed by each of the plurality of AI slices is determined based on a UE capability, UE preference assistance information, or a user plane optimization.

7. A method, performed by a wireless communication system, for performing communication and computing, the method comprising:
configuring a plurality of cells to perform the communication between at least one user equipment (UE) and at least one network (NW);
performing, via an Artificial Intelligence (AI) computing platform, the computing, the AI computing platform comprising a plurality of AI slices to perform the computing and a plurality of NW slices to perform the communication; and
selecting, by the at least one UE, one of the plurality of cells based on a received predefined order of performing at least one of an AI slice selection and a NW slice selection,
wherein:
the plurality of cells is located in any one of air, space, sea, or land,
each of the plurality of AI slices is configured to a respective part of the wireless communication system,
each of the plurality of AI slices is activated or deactivated after being configured,
the AI computing platform is configured with a two-level slice selection in which the AI slice selection and the NW slice selection are performed respectively in the received predefined order,
the AI slice selection is associated with the plurality of AI slices, and
the NW slice selection is associated with the plurality of NW slices.

8. The method according to claim 7, wherein the plurality of AI slices comprises a plurality of first AI slices, a plurality of second AI slices, and at least one third AI slice.

9. The method according to claim 8, wherein:
the plurality of first AI slices is computed in the plurality of cells, the at least one UE and the at least one NW,
the plurality of second AI slices is computed and communicated between each of the plurality of cells and the at least one UE and between each of the plurality of cells and the at least one NW, and
the at least one third AI slice is computed and communicated between the at least one NW and the at least one UE.

10. The method according to claim 7, wherein the plurality of cells supports a same frequency band in a case that the plurality of cells is located in each of the space, air, sea, and land.

11. The method according to claim 7, wherein selecting one of the plurality of cells is performed based on at least one of an intra-frequency measurement, an inter-frequency measurement, and a latency requirement.

12. The method according to claim 7, wherein the computing performed by each of the plurality of AI slices is determined based on a UE capability, UE preference assistance information, or a user plane optimization.

13. A User Equipment (UE) in a wireless communication system for performing communication and computing, the UE comprising:
at least one processor;
at least one non-transitory computer-readable medium storing one or more instructions that, when executed by the at least one processor, cause the UE to:
perform the computing via at least one of a plurality of Artificial Intelligence (AI) slices;
perform the communication with at least one network (NW) via one of a plurality of cells configured by the wireless communication system and at least one of a plurality of NW slices;
perform an AI slice selection and a NW slice selection respectively in a received predefined order; and
select one of the plurality of cells based on the predefined order of performing at least one of the AI slice selection and the NW slice selection,
wherein:
the plurality of cells is located in any one of air, space, sea, or land,
each of the plurality of AI slices is configured to a respective part of the wireless communication system,
each of the plurality of AI slices is activated or deactivated after being configured,
the wireless communication system comprises an AI computing platform configured to cooperate with the UE via at least one of the plurality of AI slices,
the AI slice selection is associated with the plurality of AI slices, and
the NW slice selection is associated with the plurality of NW slices.

14. The UE according to claim 13, wherein the plurality of AI slices comprises a plurality of first AI slices, a plurality of second AI slices, and at least one third AI slice.

15. The UE according to claim 14, wherein:
the plurality of first AI slices is computed in the plurality of cells, the UE and the at least one NW, the plurality of second AI slices is computed and communicated between each of the plurality of cells and the UE and between each of the plurality of cells and the at least one NW, and the at least one third AI slice is computed and communicated between the at least one NW and the UE.

16. The UE according to claim 13, wherein the plurality of cells supports a same frequency band in a case that the plurality of cells is located in each of the space, air, sea, and land.

17. The UE according to claim 13, wherein selecting one of the plurality of cells is performed based on at least one of an intra-frequency measurement, an inter-frequency measurement, and a latency requirement.

18. The UE according to claim 13, wherein the computing performed by each of the plurality of AI slices is determined based on a UE capability, UE preference assistance information, or a user plane optimization.

19. The UE according to claim 13, wherein the predefined order indicates that the AI slice selection is performed before the NW slice selection or that the NW slice selection is performed before the AI slice selection.

\* \* \* \* \*